Nov. 8, 1938.    J. E. TUSCHER    2,135,925
FUEL INJECTING DEVICE FOR INTERNAL COMBUSTION ENGINES
Filed Nov. 8, 1937    5 Sheets-Sheet 2
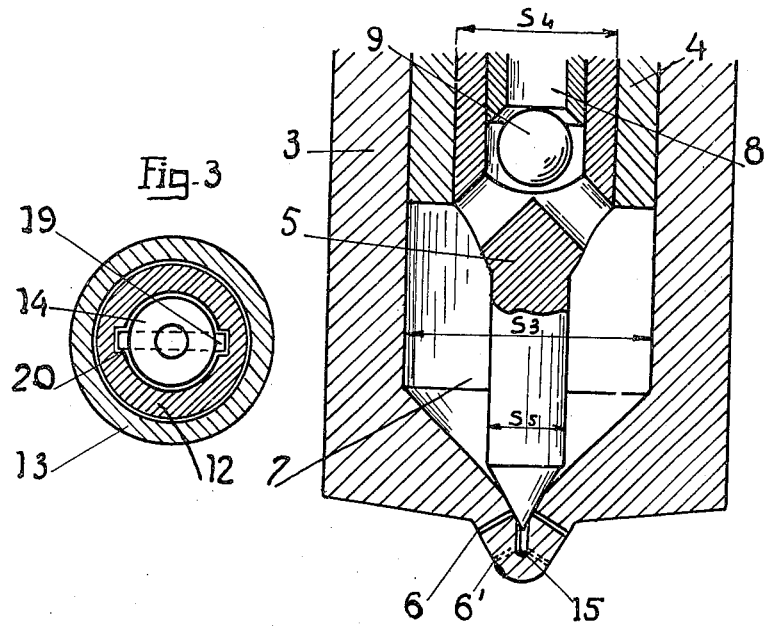
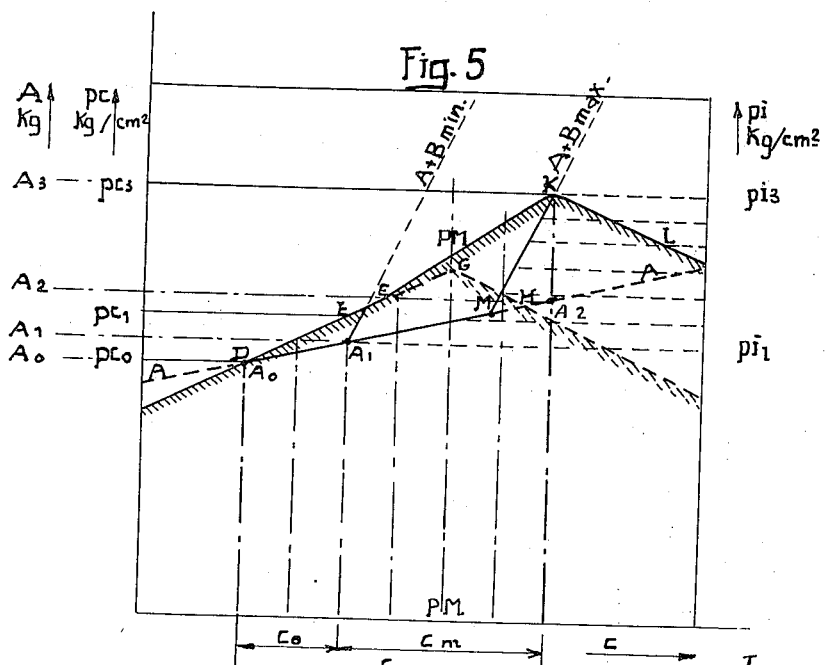
Inventor
Jean E. Tuscher
by Wilkinson & Mawhinney
Attorneys.

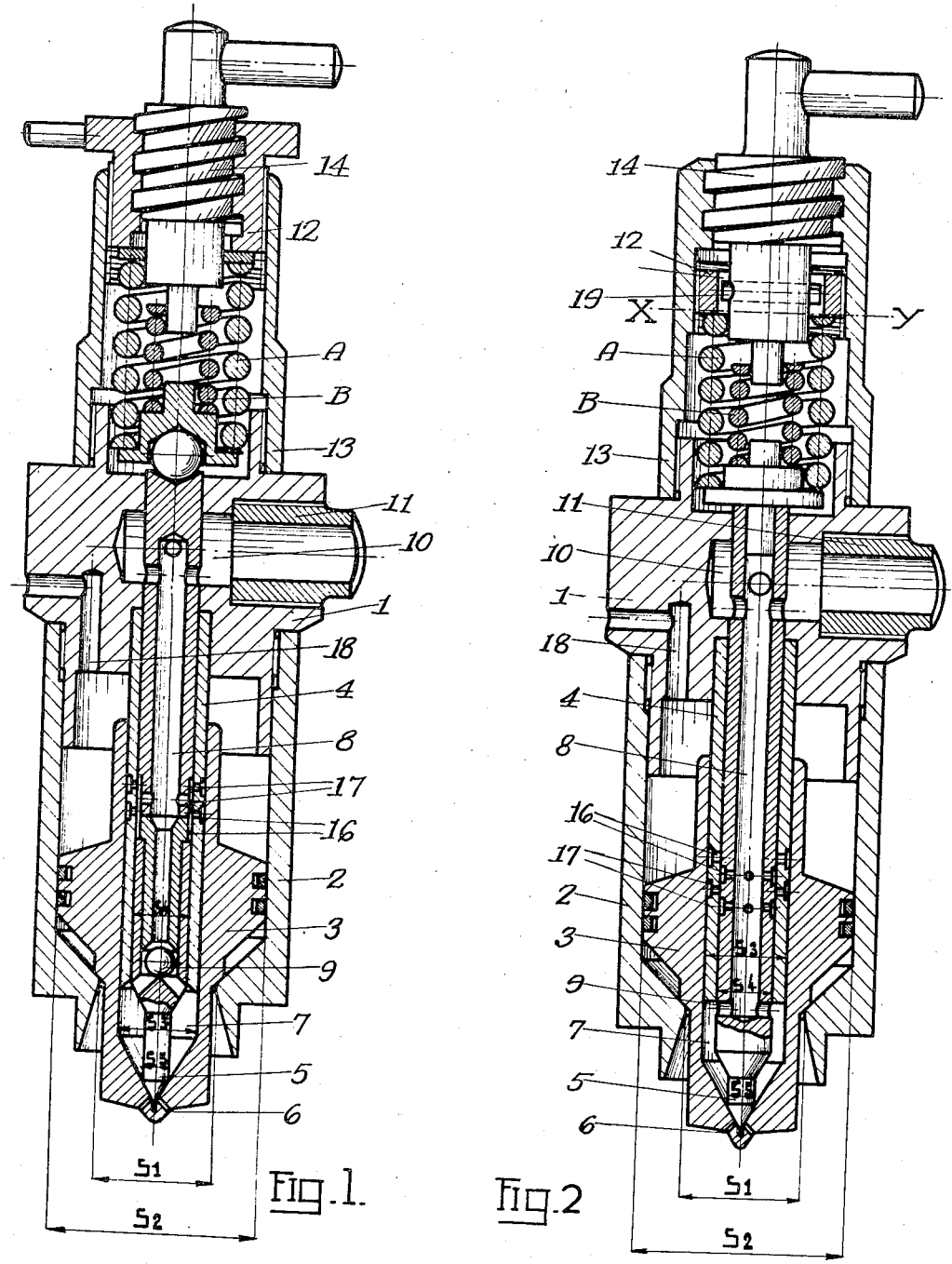

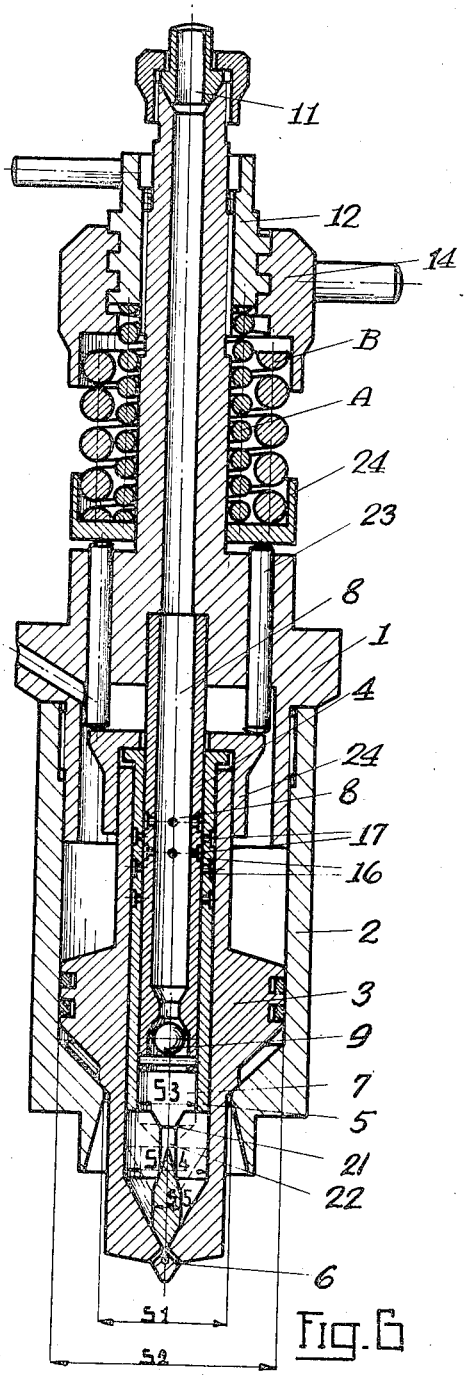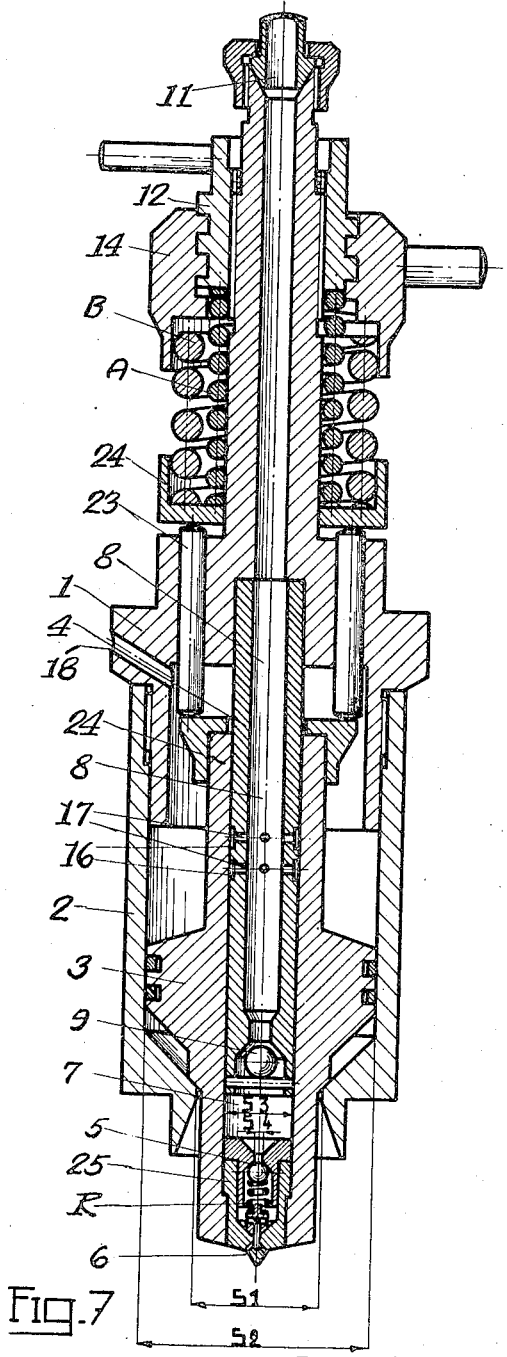

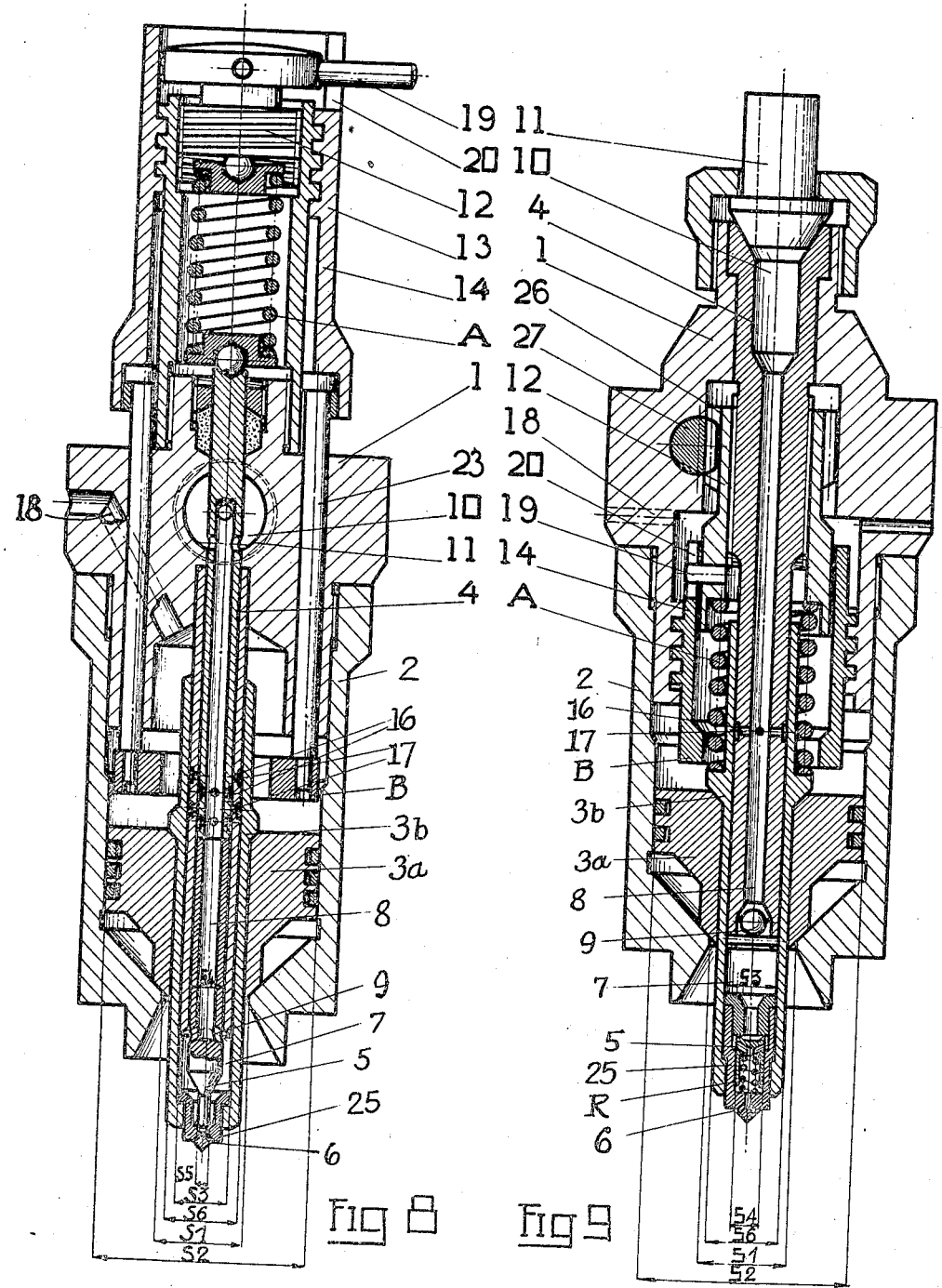

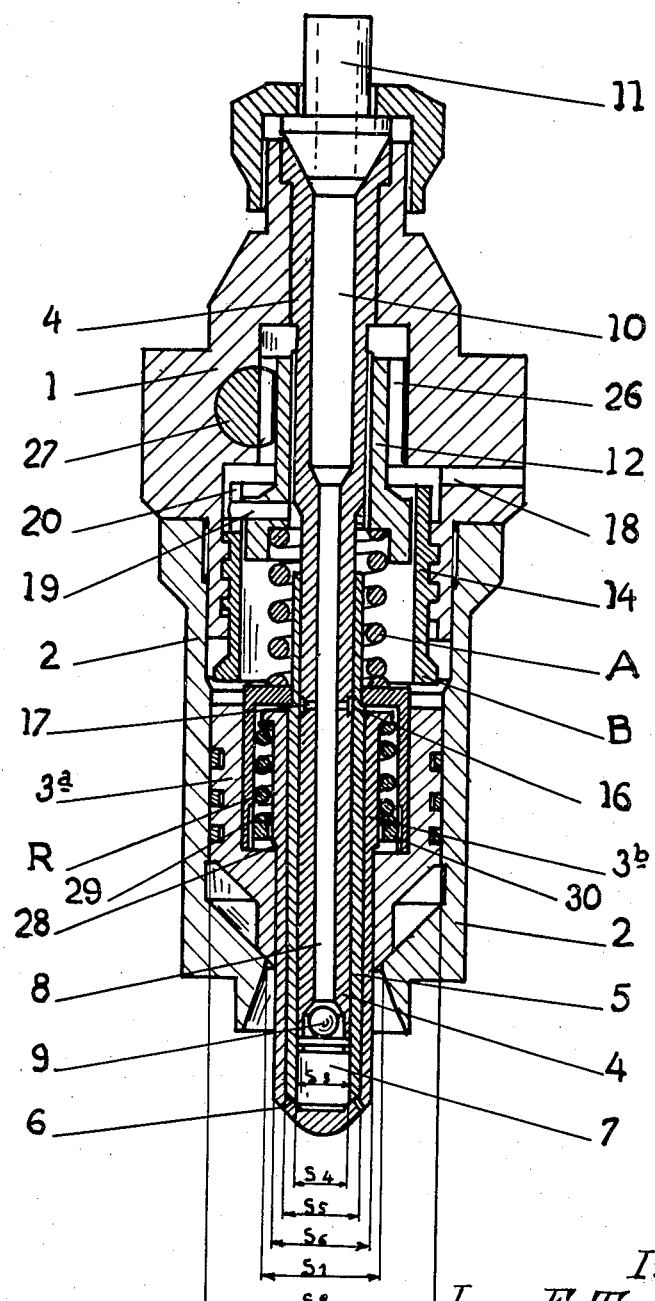

Patented Nov. 8, 1938

2,135,925

UNITED STATES PATENT OFFICE 2,135,925

FUEL INJECTING DEVICE FOR INTERNAL COMBUSTION ENGINES

Jean Edouard Tuscher, Petit Ivry, France

Application November 8, 1937, Serial No. 173,513
In France November 13, 1936

10 Claims. (Cl. 123—139)

The present invention has for its object improvements in fuel injecting devices in which the pump and the injector form a single mechanical unit actuated by the compression of the engine.

In devices of this kind, the sudden variations of pressure in the assembly of parts forming the conduit between the pump chamber and the atomization orifices produce impact waves which cause vibrations of the fuel outlet needle or valve device and produce the secondary injections which are well known in hydraulically controlled injectors.

On the other hand, the impact shocks at the end of the stroke of the piston of the mechanism likewise cause, by speed exchange, the untimely opening of the fuel outlet needle or valve device.

These two conjugated phenomena permit compressed gas from the combustion chamber of the engine to enter the conduit connecting the injector to the pump. Experience has also shown that the power of an engine and the efficiency of same increase in proportion to the speed of the injection. By reducing the injection angle to from ten to fifteen times that made necessary by the mechanical control of a pump or of an injection needle, the specific power of the engine thus supplied becomes similar to that of carburation engines, in other words, the excess of air which is necessary to obtain complete combustion is as reduced as in carburation engines.

The present invention has for its object devices which enable a perfect closing of the atomization nozzles to be obtained by eliminating the influence of pressure waves and impact shocks on the valve of the atomization nozzles, while utilizing the highest injection speeds.

In order to obtain this result, the pump chamber, which is located inside the compression chamber of the engine, extends only over a very small distance below a fixed plunger on which slides the piston of which the bore forms the walls of the pump. The atomization orifices which are controlled by the injection needle are provided in the end of the piston itself or in a bushing fitted on to a shoulder. Thus, the pressure waves which are set up in the pump chamber when the inlet is closed have such a high frequency that they do not affect the injection needle which no longer vibrates as those of hydraulically controlled injectors connected to long pipes under pressure.

The influence on the closure of the injector of impact shocks at the end of the stroke of the piston is eliminated by the method of controlling the output of the pump, which is effected by varying the stroke of the piston by means of the resilient balancing of the thrust of the compression gases at the end of the injection, such resilient balancing being effected by a system of adjustable springs which enables the injection point and discharge rate to be controlled. When the springs act on the injection needle, the transformation of the compression energy into injection pressure is complete.

According to a modification, the influence of impact shocks on the closure of the injector is eliminated by means of a second method of adjusting the output, which is effected by limiting the stroke of a differential ring forming a piston by means of an adjustable nonresilient stop, whereas the movement of a central bushing forming a pump chamber and an injector and displaced so far by the ring-piston, is resiliently stopped by the spring which adjusts the injection point.

With these two methods of controlling the output, the impacts at the end of the strike of the movable part have no effect on the injection valve. The second method permits of an injection speed which is constantly accelerated until the valve closes.

When the spring which adjusts the spot where the injection begins acts on the differential needle of the device, a definite ratio of the injection pressure is maintained relatively to the increase in the instantaneous pressure in the combustion chamber of the engine during the injection.

The low inertia of the moving parts with respect to the compression forces which can be brought into play, makes the operation of the devices compatible with the highest speeds of rotation of the engines.

The transmission of heat from the burning gases in the engine to the charge of fuel introduced into the pump chamber, is very great and enables fuel at a high temperature to be injected, whereby the time necessary for the change of phase is decreased and spontaneous ignition is facilitated. Said transmission of heat is so rapid that no trace of heating can be observed in the parts operating in the combustion chamber whatever be the speed of rotation of the engine.

Other advantages and peculiarities of the invention will become apparent from the ensuing description taken in conjunction with the accompanying drawings, in which:

Fig. 1 shows, in axial section, a combined fuel injector and pump according to the invention.

Fig. 2 shows, likewise in axial section, a modification of Fig. 1.

Fig. 3 is a transverse section of the device of Fig. 2, along the plane $x$—$y$.

Fig. 4 shows on a very large scale, the pump chamber illustrated in Fig. 1.

Fig. 5 is a diagram showing the simultaneous variations during the injection, of the compression of the engine, of the calibration of the two controlling springs of the device and of the injection pressure.

Figs. 6 to 9 are axial sections of four modifications of construction of the injection device.

Fig. 10 is an axial section of another modification.

A frame 1 extended by a gas cylinder 2 is fixed to the engine opposite each cylinder, Fig. 1. A differential piston 3 having cross-sections $S_1$ and $S_2$ opens into the combustion chamber of the engine through the bore $S_1$ of the cylinder 2. A fixed plunger 4 rigidly secured to the frame 1 is engaged in the bore $S_3$ of the piston 3. A differential needle 5 having cross-sections $S_4$ and $S_5$ closes by means of the bearing surface $S_5$ the atomization orifices 6 provided at the end of the piston 3 forming the chamber 7 of the pump.

Said pump chamber 7 at the end of the piston 3 penetrates into the cylinder of the engine, and is supplied with fuel through an inlet groove 8 of the injection needle 5. The groove 8 is closed at each stroke of the piston 3 either by an automatic inlet ball 9, Fig. 1, or by the covering of the ports 9, Fig. 2, of the needle by the fixed plunger of the device. The groove 8 is in constant communication with the reservoir 10 of the frame 1 supplied by a nipple 11.

The delivery of the pump 7 is effected through the atomization orifices 6 which open into the combustion chamber of the engine and are controlled by a surface $S_5$ of the hydraulically controlled needle 5.

The injection needle 5, which thus controls the inlet and the outlet of the fuel in the pump chamber 7, is pressed on its seat $S_5$ in the pump piston 3 by the adjustable calibration of two springs A and B which simultaneously determine the adjustment of the discharge rate of the pressure and of the injection point.

The calibration of the spring A is adjusted by the part 12 which screws into a sleeve 13 rigidly secured to the frame 1. The spring B is adjusted by the screw 14.

When inoperative, the spring A bears the needle 5 on its seat $S_5$ and consequently bears the pump piston 3 against the opening $S_1$ of the gas cylinder 2 with a force $A_0$.

When the compression in the engine reaches a certain limit, the piston 3 is lifted from its seat and the compression then acts on the cross-section $S_2$ of said piston.

Continuing its stroke, the piston 3 is urged by an increasing compression and a corresponding back-pressure in the chamber 7 of the pump is set up.

However far the needle is lifted from its seat, the injection pressure is always equal to the quotient of the load of the spring A and the cross-section $S_4$ of the needle. No stop for the needle relatively to the piston is therefore required.

In order that the combustion in a direct injection engine (without a pre-combustion chamber) may be ensured under satisfactory conditions, the injection pressure must have a minimum value which is determined by the dimensions of the combustion chamber of the engine.

The curve D, E, F, G, H, Fig. 5, shows the aspect of the compression of the engine in the vicinity of the extreme high position G, and the straight line A—A shows the increase of the load of the spring A in proportion to the stroke C of the piston 3 forming a pump.

The stroke C can be decomposed into two parts, the no-load stroke $C_0$ before the closing of the inlet 9 of the pump 7 and the working stroke $C_m$ corresponding to the injection period.

In order that it may be possible to adjust the point E where the injection starts, the straight line A—A must intersect the compression curve at two points D and H, i. e., the thrust $p_c$ of the compression on the surface $S_1$ of the piston 3 must become greater, at a certain advance point D with respect to the extreme high position G, than the load $A_0$ of the injection spring when the piston 3 is inoperative.

By decreasing or by increasing the load $A_0$ of the injection spring by means of the adjusting screw 12, the line A—A moves parallel with itself downwards or upwards in Fig. 5 and intersects the compression curve at a point D corresponding to a greater or lesser advance with respect to the extreme high position G and to a lower or a higher compression.

The adjustment of the injection point is therefore at the same time an adjustment of the pressure at the beginning of the injection, which is proportional to the compression existing when the needle is lifted.

Said adjustment of the injection point is the main factor acting on the shape of the combustion cycle resulting from the injection. When the point D is in the immediate vicinity of the extreme position G, the cycle approaches a constant pressure cycle; on the contrary, when, by adjusting the stop 12, the point where the injection starts is advanced, the combustion cycle approaches a constant volume cycle and produces a maximum pressure peak $p_c3$ which is higher and higher, point K.

If it is assumed that for a maximum injection $C_m$, the aspect of the combustion cycle (Fig. 5) is the curve F, K, L, the point F corresponding to the beginning of the combustion and the point K to the maximum pressure $p_c3$ of the cycle, said maximum pressure $p_c3$ causes a thrust $P_3$ on the piston 3 which is also a maximum.

In order to attain the load $A_3$ which has to resiliently balance the thrust of the gases on the piston 3 for any load of the engine and for any pressure $p_c3$ resulting from the injection, a spring B bearing against the discharge rate adjusting screw 14 is added to the spring A at a point M of its travel, which depends on the position of the discharge rate stop 14.

The specific calibration in kg./mm. of compression of the spring B should be selected such that its addition to the spring A, for any adjustment of the discharge rate by the stop 14, is effected at a point M which is only located towards the left beyond the point $A_1$ of the diagram of Fig. 5 to obtain the stoppage of the injection.

The section $A_1$—M of the straight line A—A shows the amplitude of the adjustment of the discharge rate stop 14.

The adjustment of the discharge rate by means of the screw 14 is balanced and can therefore be effected without any effort by the governor of the engine.

The control of the injection point and discharge rate which is thus effected by the combination of the two springs A and B therefore permits:

1. The entire compression force on the piston 3 to be converted into injection pressure.

2. A predetermined ratio to be maintained between the pressure of the gases in the engine and the injection pressure throughout the injection, so that the penetration of the fuel shall be constantly appropriate to the dimensions of the chamber of the engine and to the increase of the compression in said chamber.

3. The control of the combustion cycle that it is desired to obtain and the maximum compression that it is desired not to exceed.

4. The operation of the device to be obtained at all loads without mechanical impacts, whatever be the speed of the piston 3.

The absence of mechanical impacts ensures the mechanism a long life and prevents inrush of gases and "dewaterings" due to untimely opening of the needle 5 owing to the exchange of speeds of the piston and the needle as a result of an impact shock.

During the injection controlled by the spring A, the acceleration of the movement depends on the difference of the cross-sections $S_3$ of the pump and $S_4$ of the needle.

The thrust $P=p_c.S_2$ increases with the compression $p_c$ during the injection and can be modified by adjusting the stop 12 to advance the injection so as to obtain a combustion cycle which approaches the constant volume cycle, and to create a quick increase of the pressure $p_c$ in the engine. On the other hand, the calibration of the spring A, while maintaining the pressure $p_i1$ necessary at the beginning of the injection, can be adjusted by means of the characteristics of the spring in such a manner that it increases less rapidly than the compression $p_c$ in the engine, and this can be effected whatever be the combustion cycle resulting from the injection. The piston will have an increasing acceleration throughout the injection on the spring A.

The speed of injection depends lastly on the position of the point M, Fig. 5, where the spring B controlling the discharge rate is added to the spring A. In fact, as has been seen, the calibration of the springs A+B in order to balance more or less early the compression force and the momentum of the piston, requires to be increased quicker than the compressed $p_c$ increases, whatever be the combustion cycle.

Thus, as soon as the spring B is added at M to the spring A, the acceleration of the movement becomes negative until the needle closes and the mechanism stops prior to the suction stroke. The speed of injection will therefore be increased by causing the spring B to act as late as possible by increasing its specific calibration in kg/mm. of stroke. The greater part of the injection will thus have an accelerated speed over the section $A_1$—M of the spring A.

To obtain the maximum specific power of the engine and also its highest thermic efficiency by maintaining a positive acceleration of the injection until it is cut off, the spring B is replaced by a stop B which is likewise adjusted by the screw 14 of the frame 1, Fig. 8. This adjustable stop B limits the stroke of a differential ring $3_a$ having cross-sections $S_1$ and $S_2$ on which the compression of the engine is exerted, as described relatively to the piston 3. The bore $S_6$ of said ring $3_a$ forming a piston is itself closed by a conical bearing surface of a bushing $3_b$ sliding in the ring $3_a$ and on the fixed plunger 4 and forming in its lower part, which is engaged in the compresion chamber of the engine, the pump chamber 7. The atomization orifices are provided at the end of the bushing $3_b$ or in a separate part 25 fitted on the inside over a shoulder of the pump chamber.

When at the end of the stroke, the ring $3_a$ impinges on the adjustable stop B, the bushing $3_b$, forming a pump which is released from the thrust of the ring, is now only subjected to a compression thrust which is less than the reverse thrust of the spring A on the needle 5. The spring A closes the needle 5 on its seat $S_5$ in the ring $3_b$.

The impact of the ring $3_a$ on the stop B thus has no influence on the bushing $3_b$, the movement of which is resiliently balanced without any shock by the spring A. It is thus possible to increase the speed of injection until the valve 5 closes.

The impact stop B guided by the screw 14 stops the ring $3_a$ at any point of its stroke, so that the duration and the final pressure of the injection are in this case independent of the shape and of the maximum pressure of the combustion cycle resulting from the injection. This provides an easier control of the devices and consequently of the operation of the engine. This control, in the device shown in Fig. 8, shows the mechanism similar to that of Fig. 2 which enables, as has been seen, the retard or the advance of the injection to be varied automatically proportionally to the output of the pump, i. e., to the load of the engine.

The present practice for injection engines gives rise to many difficulties in the mechanical control either of the pumps or of the injection needles when it is proposed to attain the speeds of rotation which are customary in carburettor engines. In this case again difficulties of another kind arise owing to the resilience of the pipes connecting the pump to the injector and the pressure or impact waves in said pipes, causing vibrations of the hydraulically controlled needles and secondary injections when the injection is cut off.

This latter point has been made the object of a very particular study in the devices according to the invention.

Fig. 4 shows on a very large scale, the design of the pump chamber 7. Said chamber is reduced to a few millimetres at the end of the bore $S_3$ of the piston 3 or of the bushing $3_b$ which penetrate into the centre of the combustion chamber of the engine. When the inlet ball 9 closes the pressure waves go into resonance between the end $S_3$ of the chamber 7 and the base of the fixed plunger 4 of the same cross-section. As the injection needle has a perfectly symmetrical position in the plane of the pressure waves, it undergoes no deformation owing to said resonance. The speed of these impact waves is that of sound in the medium in which they are propagated. As this speed is of the order of one thousand metres per second in hydrocarbons, the frequency of said waves in the chamber 7 is 100,000 per second if the chamber 7 has a height of 5 mm., or 50 periods during the 0.0005 second an injection lasts. The resonance is so high that it no longer effects either the lifting or the closing of the needle 5 which does not vibrate.

As soon as the injection is completed, the ball valve 9 opens under the effect of the suction created in the pump chamber 7 by the quick and simultaneous return of the piston 3 and of the needle 5 to their inoperative position responsive to the combined action of the two springs A and B or to that of the spring A alone. A fresh charge of the fuel immediately fills the chamber 7. As the injection pressure $p_1$ instantaneously falls to the pressure of the reservoir 10 as soon as the injection is completed, it follows that the secondary injections, dripping of the injector and formation of craters at the atomization orifices 6 are radically prevented.

The absence of vibrations and of secondary lifting of the needle 5 ensures that no return of compressed gas occurs in the pump chamber 7; the fuel injected does not explode at the outlet of the nozzles 6, retains sufficient penetration and the resulting cycle is a combustion without explosive waves.

The fresh charge of fuel introduced into the chamber 7 is heated by the burning gases in the engine and by the following compression so that the fuel injected is previously raised to a high temperature which facilitates spontaneous ignition and decreases the time required for the change of phase.

In order that the injection pressure $p_1$ shall really exist up to the nozzles 6, the cone of the needle 5 itself closes these orifices. In fact, the small space 15, Fig. 4, which usually exists under the cone of injection needles and into which the atomization orifices 6' generally open, forms a pipe in which the pressure of the fuel is not the same as above the cone of the needle. This is due to the fact that the efficient distribution of the fuel in the chamber of the engine, most often requires a plurality of atomizing holes and the difficulty of drilling such holes hardly enables them to be made smaller than 0.20 or 0.15 mm. in diameter; it follows, in accordance with the laws governing the flow of liquids, that the cross-section of the holes is in general much too large for the rate of flow. The actual injection pressure in that case is not that which exists above the cone of the needle, but is substantially less than same.

When, as shown in Fig. 4, the cone of the needle itself closes the atomization orifices 6, the pressure is necessarily the same above and below the closure cone $S_5$, and this ensures an injection at the desired pressure, a more stable lifting of the needle and a greater penetration of the fuel.

The devices according to the invention do not require any leakage return pipe. In fact, the leakages of fuel from the pump 7 are returned in the inlet groove 8 by a series of labyrinth grooves 16 and of holes 17 provided in the fixed plunger 4 and in the injection needle 5 in the medial portion of the bore $S_3$ of the piston 3 or of the bushing $3_b$.

The gas cylinder 2 is provided with a discharge duct 18 formed in the frame 1 of the device.

If, for example, it is desired to obtain in engines supplied by means of these devices a combustion cycle without a considerable increase in the compression, which permits of the overfeeding and the increase of the massic power without danger of excessive pressures, the retard of the injection controlled by the stop 12 acting on the calibration of the injection spring A should increase proportionally to the load of the engine, which load is controlled by the discharge rate stop 14.

The retard or the advance of the injection can be automatically controlled proportionally to the load of the engine by the sole control of the discharge rate stop 14, Figs. 2 and 3, 8, 9 and 10. The stops 12 and 14 are in this case both screwed on the frame 1 or on a part 13 or 4 rigidly secured thereto. By means of an actuating finger 19 engaged in a mortice 20 of the screw 12, the actuation of the discharge rate screw 14 modifies the position of the stop 12 (or conversely) and adjusts the injection point in accordance with a law determined by the pitch and the direction of the threads of the two screws. When the two threads are in opposite directions, the retard of the injection is proportional to the load of the engine.

Figs. 6 to 10 show modifications of construction of the device which enable the same adjustment of the injection point and discharge rate to be effected by means of the calibration of two springs A and B or by the spring A and a stop B.

In the device of Fig. 6, the fixed plunger 4 of the pump is inside the injection needle 5. The pump chamber 7 opens through two wide symmetrical recesses 21 into the bore $S_3$ of the piston 3, providing two stays 22 which securely fasten the closure cone $S_5$ to the needle 5. The springs A and B are outside the frame 1 and act on the needle 5 through the instrumentality of slidable fingers 23 between two seats 24.

The operation of the device of Fig. 6 is exactly the same as that of Figs. 1 and 2. However, the cone $S_5$ of the needle and its two stays 22 offer the pressure waves a front surface which is opposed to the lifting of the needle. For this reason, the adjustment of the injection point can be effected with a slightly greater advance than in the case of the previous devices.

In the devices of Figs. 7 and 9, the pump and the injector operate independently. A valve 5 having a positive opening, replaces the injection needle and closes the outlet $S_4$ of the pump chamber 7 in an atomizer 25 on a bearing surface of the bore $S_3$ of the piston 3 or of the bushing $3_b$. The injection pressure is given by the calibration of a spring R on the valve 5; it is constantly equal to $$p^i = \frac{R}{S_4}$$

and cannot increase proportionally to the compression of the engine.

In the device of Fig. 7, the adjustments of the injection point and discharge rate by the springs A and B act on the piston 3 itself. In the device of Fig. 9, the adjustment of the injection point by the spring A acts on the bushing $3_b$ whereas the adjustment of the discharge rate is effected as stated for the device of Fig. 8, by impact of the ring $3_a$ on the stop B which can be adjusted by the screw 14. The stop 12 of the spring A is screwed on a thread of the fixed plunger 4 secured to the frame and carries a toothing 26 meshing with that of a rack 27 which enables, through the instrumentality of the finger 19 engaged in a groove 20 of the stop 14, the injection point and discharge rate to be adjusted simultaneously proportionally to the load of the engine.

In these devices of Figs. 7 and 9, the mechanism of the pump is simplified owing to the fact that the fixed plunger 4 is alone in the bore $S_3$ of the piston 3 or of the bushing $3_b$.

In the device shown in Fig. 10, the injection pressure which forms in the pump chamber 7 when the inlet 9 is closed, is exerted on the end $S_3$—$S_4$ of the bushing $3_b$, of which the atomization nozzles 6 are closed by a conical bearing surface of the needle 5 which slides on the fixed plunger 4.

The injection pressure is in this case equal to the calibration of the spring R increased by the thrust of the gases on the bushing 3b, relatively to the bore S5 of said bushing.

The positive lifting of the bushing 3b relatively to the needle 5 is limited by a shoulder 28 which, during the injection, abuts against a corresponding surface of the ring 3a.

Through the instrumentality of the sleeve 29 and its nut 30, the reactions of the spring R are exerted solely for closing the bushing 3b on the needle 5 and have no effect on the adjustment of the injection point by the spring A.

During the delivery stroke of the pump 7, as in the suction stroke, the springs A and R continually maintain the resilient assembly of the bushing 3b and of the needle 5, thereby preventing any shock or impact which might affect the satisfactory closing of the atomization orifices.

In the devices of Figs. 9 and 10, the adjustment of the injection point by the spring A acts on the ring 3a through the instrumentality of the bushing 3b (Fig. 9) or of the sleeve 29 (Fig. 10), whereas the adjustment of the discharge rate is effected, as stated in connection with the device of Fig. 8, by impact of the ring 3a against the stop B which is adjustable by the screw 14.

The stop 12 of the spring A is screwed on a thread of the fixed plunger 4 secured to the frame 1, and carries a toothing 26 meshing with that of a rack 27, which, through the instrumentality of the finger 19 engaged in a groove 20 of the stop 14, enables the injection point and discharge rate to be simultaneously adjusted proportionally to the load of the engine. The retard of the injection will be proportional to the load of the engine when the threads of the stops 12 and 14 are in opposite directions.

The seven devices illustrated and hereinbefore described, therefore ensure, on the one hand, by the resilient balancing of the thrust of the gases on the piston 3 or on the bushing 3b and, on the other hand, by the arrangement of the pump chamber 7, which is provided with atomization orifices 6 and reduced to a few millimetres inside the compression space of the engine, a perfect control of the injection by means of the valve 5; as the pump chamber 7 is hermetic to the compressed gases in the engine and the angle of injection can be reduced to a minimum by means of a very high speed of the piston 3, the injection of these devices produces a combustion cycle without any explosive wave, and having a low peak pressure but a high mean pressure. The efficiency and the power of the injection engines thus supplied are increased, whereas their operation becomes smoother, without any dangerous stress on their parts.

The invention has only been described and illustrated in a purely explanatory and non-limitative manner and modifications of detail can be made therein within the scope of the appended claims.

I claim:

1. A fuel injection device for internal combustion engines, comprising a casing fixed on the cylinder of the engine, a piston displaceable in said casing and actuated by the gases under pressure of said cylinder, a longitudinal bore in said piston, a fixed plunger engaged in said bore, a pump chamber formed between the lower end of said fixed plunger and the lower end of said bore and projecting inside the cylinder, atomization orifices placing said chamber in communication with said cylinder, a bore in said fixed plunger, an injection needle sliding in the bore of said plunger and bearing on the end of the pump chamber for controlling said atomization orifices, hydraulic means for displacing the needle relatively to the pump chamber to open said atomization orifices, a channel within said needle for supplying the fuel to the pump chamber, means for automatically cutting off the communication between said channel and said pump chamber, and resilient means acting on said needle to bring same back to its closed position and for resiliently balancing the thrust of the gases, said resilient means comprising a first spring which is operative throughout the stroke and a second spring which becomes operative towards the end of the stroke to resiliently balance the thrust of the gases during the entire stroke.

2. A fuel injection device for internal combustion engines, comprising a casing fixed on the cylinder of the engine, a ring forming a piston displaceable in said casing and loosely mounted on a movable bushing, said ring and said bushing being subjected to the action of the gases under pressure of said cylinder, a shoulder on said bushing for enabling said bushing to be displaced by the piston, a fixed plunger engaged in said movable bushing, a pump chamber formed between the lower end of said fixed plunger and the lower end of said bushing and projecting inside the cylinder, atomization orifices placing said chamber in communication with said cylinder, a bore in said fixed plunger, an injection needle sliding in the bore of said plunger and bearing on the end of the pump chamber for controlling said atomization orifices, hydraulic means for displacing the needle relatively to the pump chamber to open said atomization orifices, a channel within said needle for supplying fuel to the pump chamber, means for automatically cutting off the communication between said channel and said pump chamber, a stop limiting the upward movement of said ring, and a spring acting on said needle to bring same back to its closed position and for resiliently balancing the thrust of the gases.

3. A fuel injection device for internal combustion engines, comprising a casing fixed on the cylinder of the engine, a ring forming a piston displaceable in said casing and loosely mounted on a movable bushing, said ring and said bushing being subjected to the action of the gases under pressure of said cylinder, a shoulder on said bushing for enabling same to be displaced by the piston, a fixed plunger engaged in said movable bushing, a pump chamber formed between the lower end of said fixed plunger and the lower end of said bushing and projecting inside the cylinder, atomization orifices placing said chamber in communication with said cylinder, an injection needle in said pump chamber and bearing on the end of said chamber for controlling said atomization orifices, hydraulic means for bringing said needle to the open position, a channel within said fixed plunger for supplying the fuel to the pump chamber, means for automatically cutting off the communication between said channel and said pump chamber, a stop limiting the upward movement of said ring, and a spring acting on said movable bushing to resiliently balance the thrust of the gases.

4. A fuel injection device for internal combustion engines, comprising a casing fixed on the cylinder of the engine, a ring forming a piston displaceable in said casing and loosely mounted on a movable bushing, said ring and said bushing being subjected to the action of the gases under pressure of said cylinder, an injection needle loosely mounted in said bushing, a bore in said needle, a fixed plunger loosely engaged in the bore of said needle, a pump chamber formed between the lower end of said fixed plunger and the lower end of said bushing and projecting into the cylinder, atomization orifices placing said chamber in communication with said cylinder and controlled by said needle, a channel within said fixed plunger for supplying the fuel to the pump chamber, means for automatically cutting off the communication between said channel and said pump chamber, a stop limiting the upward movement of said ring, a spring acting on said needle and on said ring to bring these members back to the normal position and resiliently balance the thrust of the gases, a second spring interposed between a part rigidly secured to said needle and a shoulder of said bushing for holding these two members in the position of closure of the atomization orifices, and hydraulic means for displacing the needle relatively to the bushing to open said atomization orifices.

5. A fuel injection device for internal combustion engines, comprising a casing fixed on the cylinder of the engine, a piston displaceable in said casing and actuated by the gases under pressure of the cylinder, a longitudinal bore in said piston, a fixed plunger engaged in said bore, a pump chamber formed between the lower end of said fixed plunger and the lower end of said bore and projecting inside the cylinder, atomization orifices placing said chamber in communication with said cylinder, an injection needle in said pump chamber and bearing on the end of said chamber for controlling the said atomization orifices, hydraulic means for opening said needle, a channel within said fixed plunger for supplying the fuel to the pump chamber, means for automatically cutting off the communication between said channel and said pump chamber, and resilient means acting on said piston to resiliently balance the thrust of the gases, said means comprising a first spring which acts throughout the stroke and a second spring which becomes operative towards the end of the stroke to resiliently balance the thrust of the gases during the entire stroke.

6. An injection device according to claim 1, having a first adjustable stop for the first spring for the purpose of adjusting the point and the pressure of the injection as a function of the compression of the engine at the beginning of the injection, and a second adjustable stop for the second spring, for the purpose of adjusting the discharge rate of the injection.

7. An injection device according to claim 1, having a first adjustable stop for the first spring, for the purpose of adjusting the point and the pressure of the injection as a function of the compression of the engine at the beginning of the injection, a second adjustable stop for the second spring, for the purpose of adjusting the discharge rate of the injection, and means for simultaneously controlling the adjustment of the two stops.

8. An injection device according to claim 2, having a first adjustable stop for limiting the stroke of the ring forming a piston and for adjusting the injection discharge rate, a second adjustable stop for the spring acting on the injection needle, for the purpose of adjusting the point of injection, and means for simultaneously controlling the adjustment of the two stops.

9. An injection device according to claim 3, having a first adjustable stop for limiting the stroke of the ring forming a piston and for adjusting the injection discharge rate, a second adjustable stop for the spring acting on the movable bushing, and means for simultaneously controlling the adjustment of the two stops.

10. An injection device according to claim 4, wherein the second spring bears on an adjustable stop carried by a part rigidly secured to the injection needle, the adjustment of said stop enabling the injection pressure to be adjusted.

JEAN EDOUARD TUSCHER.